Feb. 14, 1933.  E. J. SULLIVAN ET AL  1,897,537
VEHICLE CONTROL MECHANISM
Filed Aug. 2, 1929  2 Sheets-Sheet 1
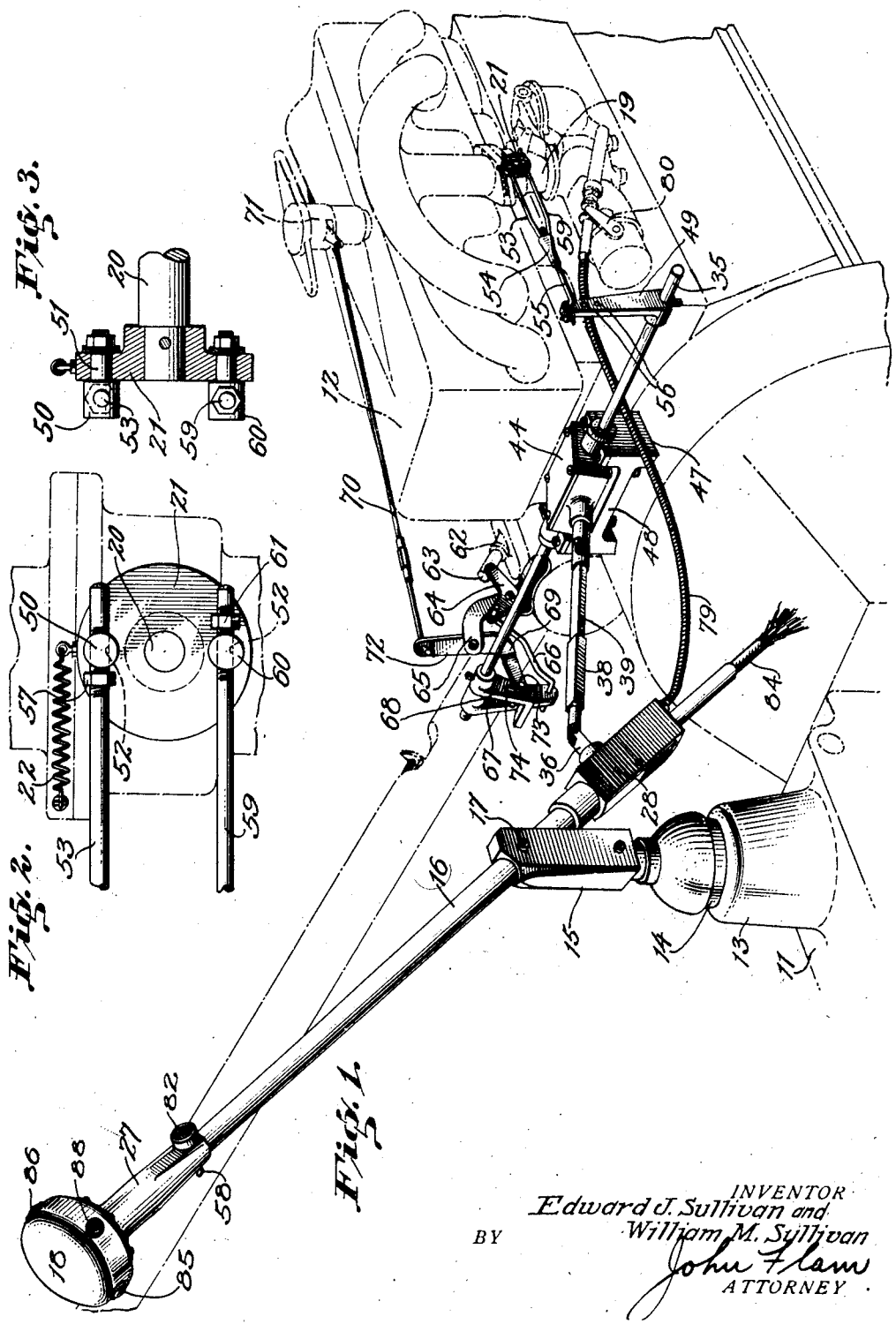
INVENTOR
Edward J. Sullivan and
William M. Sullivan
BY
John Flam
ATTORNEY Feb. 14, 1933.   E. J. SULLIVAN ET AL   1,897,537
VEHICLE CONTROL MECHANISM
Filed Aug. 2, 1929   2 Sheets-Sheet 2
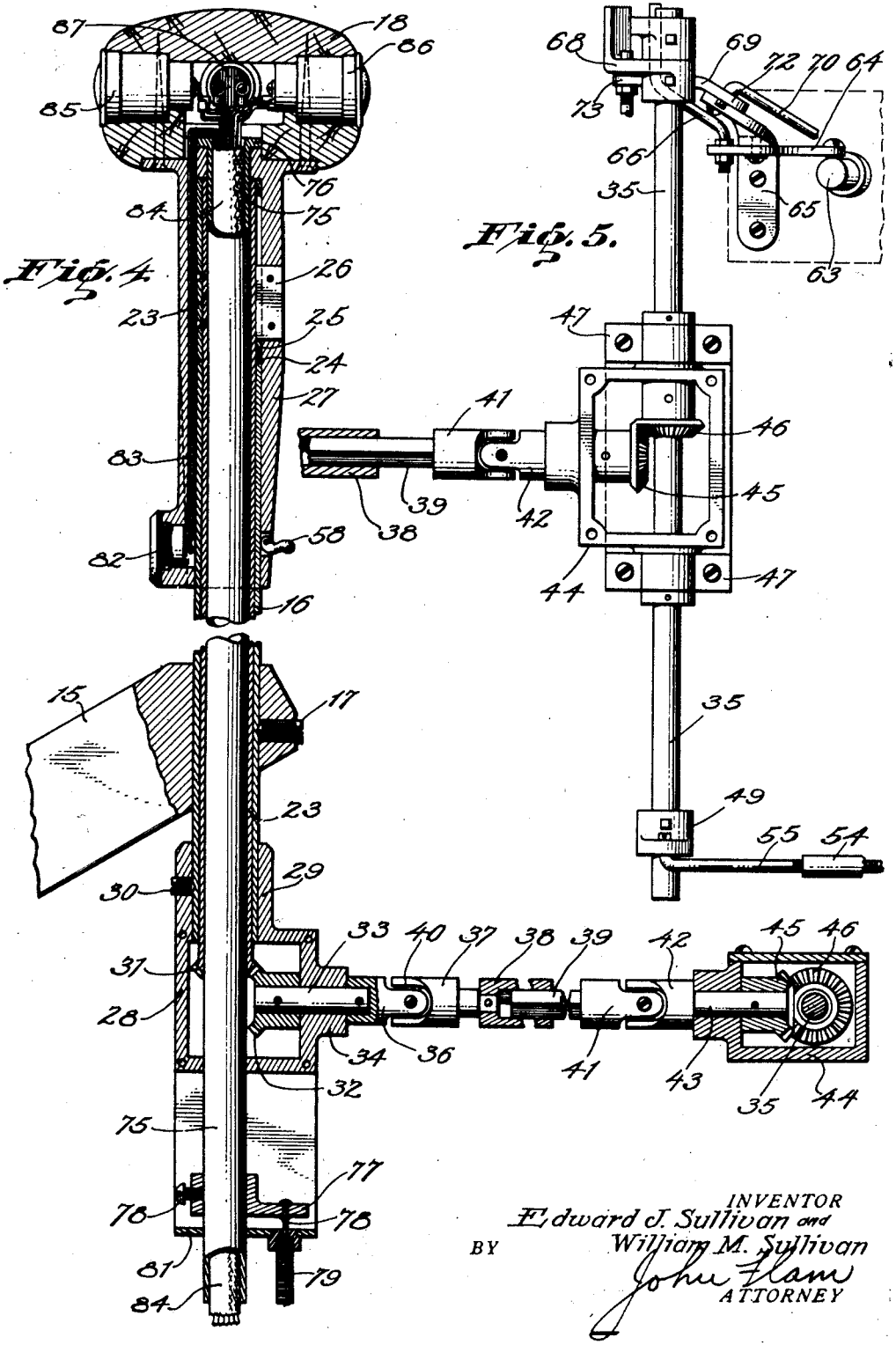
INVENTOR
Edward J. Sullivan and
BY   William M. Sullivan
John Flam
ATTORNEY Patented Feb. 14, 1933

1,897,537

UNITED STATES PATENT OFFICE

EDWARD J. SULLIVAN AND WILLIAM M. SULLIVAN, OF LOS ANGELES, CALIFORNIA

VEHICLE CONTROL MECHANISM

Application filed August 2, 1929. Serial No. 383,129.

This invention relates to a mechanism for controlling the motion of a vehicle, such as an automobile, motorboat, or airplane, for which a source of power is provided for driving the vehicle.

It is one of the objects of our invention to make it possible effectively to control the power plant of such a vehicle.

Although in the following description, we shall refer specifically to the control of gasoline engines that are used to propel land vehicles, such as automobiles, yet in its broadest aspects, our invention can be applied to other forms of vehicles and engines.

In all such vehicles, usually a control member is used to affect the motion of the vehicle, quite independently of the control of the source of power. For example, in an airplane, a "stick" is used to control the position of ailerons or the like, to determine the course of the vehicle. In a motorboat, a lever is sometimes used to reverse the drive from the source of power to the propeller. In an automobile, a brake lever for slowing down the vehicle is used; and in addition, a gear shift lever that is arranged to vary the ratio of transmission between the source of power and the vehicle.

When such a control member is operated, it is often necessary substantially simultaneously to vary the energization of the source of power. When a gasoline engine is used as such a source of power, the variation in energization is effected by a throttle control, whereby the richness or amount of fuel used, or both can be varied.

Now let us consider specifically, an automobile and its driving engine. When such an automobile slows down, it is found that there is a limit beyond which the engine cannot be throttled down without causing it to stop entirely (or to "stall", as it is commonly called). This, we believe, is due to the fact that the torque exerted by the usual internal combustion engine is rapidly reduced as its speed is reduced, and a point is finally reached where the torque becomes insufficient to move the vehicle, and the engine stops. To overcome this defect in internal combustion engine operation, it is now common to provide a variable ratio drive or transmission between the engine and the vehicle, so that for low vehicle speeds, the engine can rotate at a proportionately higher rate. Although this variation in transmission ratio is accomplished very commonly by a change in gear ratios in a transmission mechanism, other variable transmission ratio devices can be used.

In the ordinary type of automobile, a "gear shift lever" is provided for placing the transmission into any one of a number of positions, each corresponding to a different gear ratio of transmission. When so changing the transmission ratio by hand, it is necessary simultaneously to vary the engine speed by the aid of the throttle. This can ordinarily be performed by a foot accelerator. Often, however, the foot needed to operate the accelerator is needed for operating the brakes, as in heavy traffic or on hills. Thus difficulty is encountered to secure smooth operation of the vehicle. It is one of the objects of our invention to make it possible to use the same control member (such as a gear shift lever) for effecting the motion of the vehicle (as by shifting gears) as well as for varying the energization of the engine (as by the throttle control), whereby the foot accelerator need not be used, and the brake pedal can be operated as desired during the changing of the gears.

The common control member for shifting gears and for varying the energization of the engine is preferably so arranged that the hand that moves the gear shift lever can at the same time operate the throttle, as by pressing, by the aid of one or more fingers, an arm carried by the lever, or by rotating the knob at the end of the lever. It is thus another object of our invention to provide a manual control member of this character, that can be grasped by the hand, and in conjunction with which, the hand can be used to provide a plurality of simultaneous control functions.

Further elaborations of this system can if desired be provided, whereby the gear shift lever can be used as a support for signaling mechanism or switches. In this way, right and left turns can be signaled by the hand grasping the lever, as well as a stop signal and the horn. Preferably also, the starter switch can be operated, and simultaneously therewith, the spark can be retarded and the throttle opened to the proper degree for starting purposes. This method of starting therefore involves merely a simple and single movement of the hand, instead of a rather complicated procedure heretofore practiced. Thus to start the engine, it has been common practice first, to throw the spark lever to retarding position; second to adjust the hand throttle control; third, to close the ignition switch; fourth, to pull out a choke; and fifth, to step on the starter plunger. With the aid of our invention, the spark lever and the gas throttle are automatically moved when the starter is operated.

Our invention may also be defined as a system that purposely correlates substantially all of the control devices in a compact unit that can be operated either separately or simultaneously, by one hand of the operator; and we have chosen the gear shift lever as the foundation or basis of the system.

Our invention possesses many other advantages, and has other objects which may be made more easily apparent from a consideration of one embodiment of our invention. For this purpose we have shown a form in the drawings accompanying and forming part of the present specification. We shall now proceed to describe this form in detail, which illustrates the general principles of our invention; but it is to be understood that this detailed description is not to be taken in a limiting sense, since the scope of our invention is best defined by the appended claims.

Referring to the drawings:

Figure 1 is a perspective view of a mechanism embodying our invention, showing it installed with an automobile engine;

Fig. 2 is an enlarged detail fragmentary view showing the throttle valve operating mechanism;

Fig. 3 is a sectional view of the parts shown in Fig. 2;

Fig. 4 is a longitudinal section, partly broken away, of a control member incorporating my invention; and Fig. 5 is a top plan view of a part of the control mechanism, a few of the parts being in section, and a cover for a gear box being removed.

In Fig. 1 we show an automobile assembly including a transmission casing 11, and an engine 12. Extending upwardly from casing 11 is a boss 13 in which is supported a ball and socket bearing member 14, whereby angular movement of an arm 15 can cause, in the usual way, a shifting of gears in casing 11, and thus to vary the transmission ratio from engine 12 to the driven wheel or wheels of the vehicle. Movement of this arm is effected by the aid of a control member 16 in the form of a manually manipulable lever, held in arm 15 as by set screws 17. This arm has a knob 18 at its upper extremity to permit its ready grasping by the hand of the operator.

Engine 12 is shown in this instance as having a carburetor 19, equipped with a butterfly valve for varying the amount of air that is sucked into the intake manifold and thereby varying the amount of liquid fuel taken up by the engine. A shaft 20 (Figs. 2 and 3) can be connected to the valve, not shown, and a disc 21 is fastened thereto, whereby rotation of the disc (for example in a clockwise direction) will serve to open the butterfly valve against the action of a closing spring, such as 22. We arrange matters in such a way that this shaft 20 can be controlled by the hand that is grasping knob 18, by exerting upon the knob a force in a direction different from that needed to manipulate the gear shift. Thus for example, knob 18 can be rotated in a clockwise direction to effect this result. The mechanical connections between the knob 18 and the shaft 20 will now be described.

We have omitted from Fig. 1, any showing of the floor boards or the dash board of the automobile, it being understood, that the lower end of lever 16 may project through arm 15 and down below the floor boards. Lever 16 is hollow, and rotatable within it is a rod 23. This rod extends beyond the end 24 of lever 16 and carries a sleeve 25 fastened thereto, which sleeve normally rests against the top of lever 16. Rod 23 is rotatable by knob 18, as by the aid of a spline 26 engaging in a slot in sleeve 25. This spline is carried by a depending skirt 27 fastened to knob 18.

The lower end of lever 16 carrier a gear box 28, as by the aid of a boss 29 held to lever 16 by one or more set screws 30. The lower end of rod 23 carries a bevel gear 31 housed in box 28. This meshes with a gear 32 fastened to a shaft 33 journaled in a boss 34 in a side wall of box 28. From shaft 33 a transmission is provided by the aid of which a transverse shaft 35 supported in stationary bearings, (Figs. 4 and 5) can be driven, independently of the shifting of lever 16 into any one of its gear shift positions. To accomplish this result, a universal joint mechanism is provided.

One element of this mechanism is a swivel knuckle member 36 carried by the end of shaft 33, and cooperating with a corresponding knuckle member 37 and cross piece 40 to form a conventional universal joint. This member rigidly carries a sleeve 38 having a spline driving connection with a rod 39, as by having a square hollow portion and by making rod 39 square. This rod 39 in turn actuates one knuckle member 41 of a universal joint, the other knuckle member 42 of which is carried by a shaft 43. This shaft 43 is journalled in the side of a gear box 44, and carries at its inner end, a bevel gear 45. This gear meshes with and drives a gear 46 fastened to transverse shaft 35. This shaft is journalled in the stationary bearings 47 provided for it at each end of box 44. As shown most clearly in Fig. 1, this box 44 can be supported on a stationary stand 48. It is now apparent that sidewise or back and forth movement of lever 16 will in no way interfere with the transmission of rotary motion between knob 18 and the transverse shaft 35.

Shaft 35 rigidly carries an arm 49. This arm, as knob 18 is rotated in a clockwise direction, is rotated by shaft 35 in a clockwise direction, as viewed in Fig. 1. This movement can serve to actuate disc 21. For this purpose, disc 21 carries a pin 50 having a shank 51 pivoted in the disc, and an aperture 52 in the head portion, for passing a link 53 therethrough. This link 53 is fastened to a threaded member 54 that can be thus axially adjusted on a threaded rod 55. This rod 55 is in turn pivoted in any one of a number of apertures 56 in lever arm 49, whereby the degree of movement of link 53 can be adjusted by changing the position of rod 55 on lever 49. Link 53 carries an abutment 57 at its end, arranged to engage with the head of pin 50 as link 53 is pushed to the right, thereby rotating disc 21 against the action of spring 22.

It is thus apparent that knob 18 can be used to rotate shaft 20 and a perfect control of the throttle can be secured even while gears are shifted. This is of great help in handling a car in traffic, for the right foot can be thus retained on or near the brake pedal, keeping the car under perfect control at all times. When knob 18 is released, spring 22 or its equivalent returns the throttle to closed position.

However, if desired, the knob 18 can be retained in any gas feeding position. For example, the skirt 27 (Fig. 4) can be arranged to carry an eccentric pivoted lever 58, manipulable by hand, and arranged when urged downwardly to wedge into a roughened surface on the arm 16 and thus to hold the knob 18 against rotation with respect to said arm.

We preferably arrange matters in such a way that a reverse movement of knob 18 serves as a starting control of the engine, as by connecting a starting motor, and simultaneously feeding gas and retarding the spark. The gas feed is accomplished by a link 59 (Figs. 1, 2, and 3) also carried by threaded yoke member 54, and by the aid of a pin 60 that is similar to pin 50. However, in this case, link 59 carries an abutment 61 that actuates disc 21 when link 59 is pulled to the left, due to the reverse actuation of knob 18. During this movement to the left, the abutment 57 merely recedes from the head of pin 50, while abutment 61 pushes against pin 60. Since pin 60 is diametrically opposite pin 50, this movement is such that disc 21 is nevertheless urged to opening position. It is thus apparent that either direction of movement of shaft 35 will cause gas to be fed.

Counterclockwise movement of shaft 35 serves to cause a starting switch 62 to be closed, but only while force is exerted on shaft 35. The movable part 63 of the switch is carried pivotally by a bell crank 64 (Figs. 1 and 5) which in turn is pivoted on a stationary support 65. This bell crank is arranged to be actuated by link 66 connecting it to a lever arm 67. This arm 67 is supported rotatably on shaft 35, but is arranged to be urged toward the right by a lever arm 68 rigidly fastened to shaft 35. Thus if shaft 35 rotates in a clockwise direction, lever 68 will simply move away from arm 67, and the spring associated with switch 62 will keep this switch open. However, if shaft 35 is rotated in a counterclockwise direction, lever 68 pushes lever arm 67, link 66 is pushed toward the right, crank 64 is rotated in a clockwise direction, and switch 62 closes. Thus it is seen that counterclockwise rotation of knob 18 will complete the starting circuit and will also feed gas to the engine 12.

We can also arrange matters in such a way that the spark is retarded during the starting of the engine. For this purpose, a lever 69 can be pivoted on stationary support 65, one arm 72 being connected as by an adjustable link 70, with the distributor mechanism 71. The other arm 73 has a slot 74 and pin connection with lever 68, so that as this lever 68 is rotated, it will serve to adjust the spark position. By appropriately shaping slot 74, it is possible to effect automatic spark adjustment for all points of the throttle opening that is the best for each particular throttle position. If, however, merely a retarding effect is desired, the spark setting lever 69 can be so arranged as to be effective to move the link 70 only upon counterclockwise movement of shaft 35.

It is often desired to operate a choke device especially for setting the choke during initial operation of the engine. This is accomplished usually by pulling a button on the dashboard to which a wire is connected. In our present arrangement, choke operation can be readily effected by merely pulling on knob 18. When knob 18 is pulled, a central pipe 75 is pulled with respect to rod 23, in which pipe 75 is slidable. This is accomplished by having collar 76 at the upper end of pipe 75 fastened to the upper portion of skirt 27. This pipe freely slides through gear 31, and due to the spline connection between skirt 27 and sleeve 25, this axial movement does not in any way interfere with rotation of gear 31 by the aid of knob 18. At the lower end of pipe 75, there is fastened an arm 77, as by screw 78. To this arm is fastened a cable 78 passing through a flexible conduit 79 and leading to the choke operating arm 80. This flexible conduit 79 fastens into a strap 81 carried by gear box 28.

It is preferable also, to provide such devices as an ignition switch and signaling switches on the control member formed by arm 16 and knob 18. Thus an ignition control key can be inserted in a lock switch 82 supported on skirt 27. The wiring 83 for this switch can extend upwardly through skirt 27 and down through pipe 75. The cable 84 can carry the ignition system wires, as well as wires leading to direction switches such as 85, 86, 87 and to a horn operating button 88. In the present instance, push button switches are indicated for this purpose, but other forms of switches could obviously be used. Buttons 85, 86, 87 can be respectively used to indicate a right turn, a left turn, and "stop" by the aid of lights or the like, at or near the rear of the vehicle.

We have detailed at length one form of our invention, which is especially adapted for automobile control. The principle of affecting the motion of a vehicle as by gear shifting or by brake operation and of utilizing the same control member for varying the energization of a source of power (such as by throttle control) can be readily adopted in other forms of vehicles, where such simultaneous operations are desirable.

It may also be advantageous at this point to restate briefly the mode of operation of our control device. Assuming that engine 12 is stopped and that it is desired to start the engine and operate the vehicle, the first step is to close the ignition switch 82, after making sure that arm 16 is in neutral position. Then knob 18 is rotated in a counterclockwise direction. This causes shaft 35 to be rotated in such direction as to operate lever 72 to retard the spark, as well as to close starting motor switch 62. At the same time, shaft 20 of carburetor 19 is rotated to feed gas to the engine 12. Knob 18 can also be simultaneously pulled to operate the choke wire 78.

After the engine starts, knob 18 can be released, to permit the engine to idle. The gears can be engaged (with the clutch out) by manipulation of arm 16. Then the engine can be controlled by feeding gas by manipulation of knob 18 in a clockwise direction, the clutch being now allowed to engage. Lever 58 can if desired, be used to set the throttle to any desired position. In operating the vehicle in traffic, the foot can be kept on or near the brake pedal without in any way interfering with the feed of gas to the engine 12, by rotation of knob 18. In shifting gears, the knob 18 can be actuated to speed up or slow down the engine 12 as required by the particular shift accomplished.

We claim:

1. In a device for controlling the operation of a vehicle driven by an internal combustion engine, an arm movable by the hand of the operator to affect the motion of the vehicle, a control member supported on the arm and capable of being moved in either direction by the operator while the arm is grasped, means arranged to control a gas throttle for the engine in accordance with the movement of the member in one direction, and means arranged to control a starter mechanism for the engine in accordance with the movement of the member in the opposite direction.

2. In a device for controlling the operation of a vehicle driven by an internal combustion engine, a gear shift arm movable by the hand of the operator, a control member supported on the arm and capable of being moved in either direction by the operator while the arm is grasped, means arranged to control a gas throttle for the engine in accordance with the movement of the member in one direction, and means arranged to control a starter mechanism for the engine in accordance with the movement of the member in the opposite direction.

3. In a device for controlling the operation of a vehicle driven by an internal combustion engine, a gear shift arm movable by the hand of the operator, a knob rotatably mounted on the arm and arranged to be grasped by the operator to move the arm, means arranged to control a gas throttle for the engine in accordance with the rotation of the knob in one direction, and means arranged to control a starter mechanism for the engine in accordance with the rotation of the knob in the other direction.

4. The combination as set forth in claim 1, with the addition of means, also operated by the movement of the member in the opposite direction, to retard the spark.

5. The combination as set forth in claim 1, with the addition of means, also operated by the movement of the member in the opposite direction, both to retard the spark and to open a throttle for the engine.

6. The combination as set forth in claim 3, with the addition of means, also operated by the rotation of the knob in the other direction, to retard the spark.

7. The combination as set forth in claim 3, with the addition of means, also operated by the rotation of the knob in the other direction, both to retard the spark and to open a throttle for the engine.

8. In a device for controlling the operation of a vehicle driven by an internal combustion engine, an arm movable to control the ratio of transmission, a member movably mounted on the arm and arranged to be moved in either direction from a central position by the operator of the arm, means for controlling the fuel fed to the engine by movement of the member in one direction, and means for controlling the phase of the ignition by movement of the member in the opposite direction.

9. In a device for controlling the operation of a vehicle driven by an internal combustion engine, an arm movable to control the ratio of transmission, a member movably mounted on the arm and arranged to be moved in either direction from a central position by the operator of the arm, means for controlling the fuel fed to the engine by movement of the member in one direction, and means for controlling the phase of the ignition, as well as the fuel fed to the engine, by movement of the member in the opposite direction.

10. In a device for controlling the operation of a vehicle driven by an internal combustion engine, an arm movable to control the ratio of transmission, a knob supported rotatably on the arm for controlling the speed of the engine, and means responsive to a movement of the knob to increase or decrease the amount of fuel fed to the engine said knob being movable longitudinally of the arm for controlling a choke device for the engine, and means connecting the knob and the choke device.

11. In a device for controlling the operation of a vehicle driven by an internal combustion engine, an arm movable to control the ratio of transmission, a knob mounted both for rotation and axial movement on the arm, and means connecting the knob to the engine, said rotation serving to control the flow of fuel to the engine, and said axial movement serving to control a choke device for the engine.

In testimony whereof, we have hereunto set our hands.

EDWARD J. SULLIVAN.
WILLIAM M. SULLIVAN.